(12) United States Patent
Boutcher

(10) Patent No.: US 6,493,768 B1
(45) Date of Patent: *Dec. 10, 2002

(54) REMOTE PROCEDURE INTERFACE WITH SUPPORT FOR MULTIPLE VERSIONS

(75) Inventor: David C. Boutcher, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/251,769

(22) Filed: Feb. 17, 1999

Related U.S. Application Data

(63) Continuation of application No. 08/582,141, filed on Jan. 2, 1996, now Pat. No. 5,915,112.

(51) Int. Cl.[7] .............................................. G06F 9/40
(52) U.S. Cl. ........................................ 709/330; 717/170
(58) Field of Search ............................... 709/310–320, 709/328–330; 717/168–178

(56) References Cited

U.S. PATENT DOCUMENTS

| | | | |
|---|---|---|---|
| 4,887,204 A | * 12/1989 | Johnson et al. | 707/10 |
| 4,897,781 A | * 1/1990 | Chang et al. | 707/201 |
| 5,187,790 A | * 2/1993 | East et al. | 709/330 |
| 5,202,971 A | * 4/1993 | Henson et al. | 707/8 |
| 5,247,676 A | * 9/1993 | Ozur et al. | 709/328 |
| 5,249,293 A | * 9/1993 | Schreiber et al. | 709/203 |
| 5,265,250 A | * 11/1993 | Andrade et al. | 709/330 |
| 5,287,504 A | * 2/1994 | Carpenter et al. | 709/330 |
| 5,307,490 A | * 4/1994 | Davidson et al. | 709/330 |
| 5,321,841 A | * 6/1994 | East et al. | 709/330 |
| 5,329,619 A | * 7/1994 | Page et al. | 709/330 |
| 5,404,523 A | * 4/1995 | DellaFera et al. | 709/101 |
| 5,497,463 A | * 3/1996 | Stein et al. | 709/203 |

FOREIGN PATENT DOCUMENTS

| | | | | |
|---|---|---|---|---|
| JP | 4-107741 | * | 4/1992 | G06F/9/46 |
| JP | 6-301618 | * | 10/1994 | G06F/13/00 |

OTHER PUBLICATIONS

H. Higaki, "Group Communications Algorithm for Dynamically Updating in Distributed Systems", IEICE Trans. Inf. Syst. (Japan), vol. E78-D, No. 4, pp. 444–454, Apr. 1995 (abstract).*

Huang et al., "Designing an Agent Synthesis System for Cross–RPC Communication", IEEE Transactions on Software Engineering, vol. 20, No. 3, pp. 188–198, Mar. 1994.*

Betz, Mark, "Interoperable objects: laying the foundation for distributed–object computing," Dr. Dobb's Journal, v19, n11, p. 18(13), Oct. 1994.*

* cited by examiner

*Primary Examiner*—St. John Courtenay, III
(74) *Attorney, Agent, or Firm*—Merchant & Gould

(57) ABSTRACT

A distributed computer system incorporating multiple computer processes enables a client computer process to request execution of a remote procedure on a server computer process even when the server computer process does not support a current version of the client computer process. A version map is utilized by the client computer process while requesting a remote procedure to format the request to a version supported by the server computer process, thus permitting client and server computer processes coresident in a distributed computer system to be upgraded independently while ensuring backward-compatibility with earlier versions.

27 Claims, 10 Drawing Sheets

```
/******************************************/
/* Test interface. Version 1.0            */
/******************************************/
interface testint version(1:0)
{
    /* User information structure */
    struct userStruct {
        ucchar user[20];
        int uid;
        char comment[100];
    };

getUser(svrname ServerName,
        in int uid,
        out struct userStruct *userData);

setUser(svrname ServerName,
        in struct userStruct userData);

getUIDfromName(svrname ServerName,
               in char *user,
               out int *uid);

getNamefromUID(svrname ServerName,
               in int uid,
               out char *name);
}
```

FIG. 3

```
/*********************************************/
/* Test interface. Version 1.0               */
/*********************************************/
interface testint version(1:0)
{
   /* User information structure */
   struct userStruct {
      ucchar user[20];
      int uid;
      char comment[100];
      };

getUser(svrname ServerName,
        in int uid,
        out struct userStruct *userData);

setUser(svrname ServerName,
        in struct userStruct userData);

getUIDfromName(svrname ServerName,
               in char *user,
               out int *uid);

getNamefromUID(svrname ServerName,
               in int uid,
               out char *name);
}
```

```
/*******************************************/
/* Test interface. Version 2.0              */
/*******************************************/
interface testint version(2:0)
{
    /* User information structure */
    struct userStruct {
        ucchar user[30]; /* User is now 30 characters */
        int uid;
        char comment[100];
    };

getUser(svrname ServerName,
        in int uid,
        out struct userStruct *userData)
    versionmap(1.0 BYNAME);

setUser(svrname ServerName,
        in struct userStruct userData)
    versionmap(1.0 BYNAME);

getUIDfromName(svrname ServerName,
            in char *user,
            out int *uid)
    versionmap(1.0 DIRECT);

getNamefromUID(svrname ServerName,
            in int uid,
            out char *name)
    versionmap(1.0 DIRECT);

testUID(svrname ServerName, /* New function */
        in int uid);
    versionmap(1.0 MapTestUidProc);
}
```

REMOTE PROCEDURE INTERFACE WITH SUPPORT FOR MULTIPLE VERSIONS

This application is a Continuation of application Ser. No. 08/582,141, filed Jan. 2, 1996, now U.S. Pat. No. 5,915,112, which application(s) are incorporated herein by reference.

FIELD OF THE INVENTION

The invention generally relates to distributed computer systems, and in particular, relates to supporting multiple versions of client and server computer processes existing in distributed computer systems.

BACKGROUND OF THE INVENTION

Distributed computer systems have become more widespread as interconnected computer networks and the like have proliferated. Distributed computer systems are characterized by the sharing of resources and the use of multiple computer "processes" running on multiple computer systems to cooperatively perform tasks, where computer "processes" are routines or threads running or executing on computer systems, e.g., as part of larger applications or programs. Distributed operating principles may be found, for example, on Local Area Networks (LAN's), Wide Area Networks (WAN's), and on global distributed networks such as the Internet.

One way in which multiple computer processes may cooperatively perform tasks is under a "client-server" relationship. In such a relationship, a "client" or calling computer process issues or sends a request for a remote procedure to a "server" or receiving computer process which executes the procedure. It will be appreciated that while one computer process may function as a client when it issues a procedure request and another may function as a server when it executes the procedure, any computer process may function as both a client and a server in different capacities.

A preferred manner of passing remote procedure requests between clients and servers is through Remote Procedure Calls (RPC's), which are typically defined using a remote procedure interface, e.g., using a specific Interface Definition Language (IDL). IDL's have been developed, for example, for the Open Systems Foundation Distributed Computing Environment (OSF DCE), the Windows 95 and Windows NT operating systems, the UNIX operating system, and the Sun Network File System (NFS), among others.

As new functionality is implemented in computer processes and environments, however, remote procedure interfaces often may be enhanced to support the new functionality. As is common in the industry, enhancements to a remote procedure interface, like any computer program or application, are embodied in a new "version" of the interface.

To support a new version of a remote procedure interface, both the client and server utilizing the interface must support the new version. In many distributed computer systems, however, it is impossible or impractical to upgrade all clients and servers at the same time to a new version of a remote procedure interface. This may be due to cost constraints (e.g., in internal networks) or due to lack of control (e.g., in shared or public networks). Consequently, multiple versions of an interface may exist over a network.

The only manner used heretofore to handle multiple interface versions is to allow servers to support multiple versions, with clients supporting only single versions. In such implementations, it is incumbent for the RPC runtime code on a server to detect the version of the interface used by a client and direct any requests to appropriate versions of routines on the server. However, if a client issues a request using a version not supported by the server, the request fails.

These implementations are thus not capable of handling the situation of when a client is upgraded to a new version of an interface before a server. Furthermore, this situation is exacerbated in the situation where computer processes function as both clients and servers, where conventional implementations would require all processes to be upgraded at the same time.

Therefore, a substantial need has arisen for a manner of supporting multiple versions of a remote procedure interface in a distributed computer system, which permits both clients and servers to seamlessly support multiple versions coexisting within the system.

SUMMARY OF THE INVENTION

The invention addressees these and other problems associated with the prior art in providing an extended remote procedure interface which maps each remote procedure defined in the interface to prior versions of the remote procedure. This enables client computer processes to utilize a version map from the interface when requesting execution of remote procedures so that the requests are in formats supported by the server computer processes executing the remote procedures, regardless of the versions of the remote procedure interface in the client and server processes. This is in direct contrast to conventional systems, as the preferred remote procedure interfaces enable clients, and not just servers, to support multiple versions of an interface.

By mapping remote procedures to prior versions of the same, the manner or order in which clients and servers are upgraded in a distributed computer system are no longer critical, which is particularly beneficial in shared and public network environments where control over interface versions is all but impossible. Moreover, as remote procedure interfaces and distributed computing applications are enhanced and additional versions are supported, new applications may be implemented with less effort and with greater backward compatibility and seamless integration into existing systems. Further, often much of the underlying code can still remain the same, thereby freeing the interface from particular computer architectures and making the interface less platform-dependent.

Therefore, in accordance with one aspect of the invention a computer system is provided comprising a client computer process for requesting a remote procedure to be executed by a server computer process external to the client computer process. The client computer process supports a first version of the remote procedure and the server computer process supports a second version of the remote procedure. The client computer process includes a mapper that maps the first version of the remote procedure to the second version of the remote procedure if the server computer process does not support the first version of the remote procedure; and a requester, coupled to the mapper, that requests the server computer process to execute the second version of the remote procedure.

According to an additional aspect of the invention, a distributed computer system is provided, which includes first and second computer systems coupled through a network; a remote procedure interface residing in the first computer system, the remote procedure interface defining a first version of a remote procedure and a version map that maps the first version of the remote procedure to a second version of the remote procedure; and a request handler, residing in the first computer system and having access to the remote procedure interface, that requests execution of the remote procedure on a computer process on the second computer system, wherein the request handler utilizes the version map in the remote procedure interface to request execution of the second version of the remote procedure if the computer process on the second computer system does not support the first version of the remote procedure.

In accordance with a further aspect of the invention, there is provided a method for requesting in a first computer process a remote procedure to be executed by a second computer process. The method includes the steps of determining in the first computer process whether the second computer process supports a first version of the remote procedure which is compatible with the first computer process; and if the second computer process does not support the first version of the remote procedure: mapping the first version of the remote procedure to a second version of the remote procedure which is compatible with the second computer process; and requesting the second computer process to execute the second version of the remote procedure.

According to another aspect of the invention, a program storage device is provided which readable by a first computer process. The program storage device tangibly embodies a program of instructions executable by the first computer process to request a remote procedure to be executed by a second computer process. The program includes a version map that maps a first version of a remote procedure to a second version of the remote procedure which is compatible with the second computer process; and a request handler that issues a request to execute the remote procedure on the second computer process, wherein the request handler utilizes the version map to issue a request to execute the second version of the remote procedure if the second computer process does not support the first version of the remote procedure.

According to a further aspect of the invention, a method is provided for transmitting a program product to a computer system. The method includes the steps of establishing a connection with the computer system; and transmitting the program product to the computer system, the program product being executable by a first computer process on the computer system to request execution of a remote procedure by a second computer process. The program product includes a version map that maps a first version of a remote procedure to a second version of the remote procedure which is compatible with the second computer process; and a request handler that issues a request to execute the remote procedure on the second computer process, wherein the request handler utilizes the version map to issue a request to execute the second version of the remote procedure if the second computer process does not support the first version of the remote procedure.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there are described preferred embodiments of the invention.

BRIEF DESCRIPTION OF THE DRAWINGS

FIG. 3 is an exemplary remote procedure interface defined in an interface definition language (IDL).

FIG. 4 is an extension of the remote procedure interface of FIG. 3, incorporating version mapping consistent with the principles of the invention.

DETAILED DESCRIPTION OF THE PREFERRED EMBODIMENTS

Figure 1:
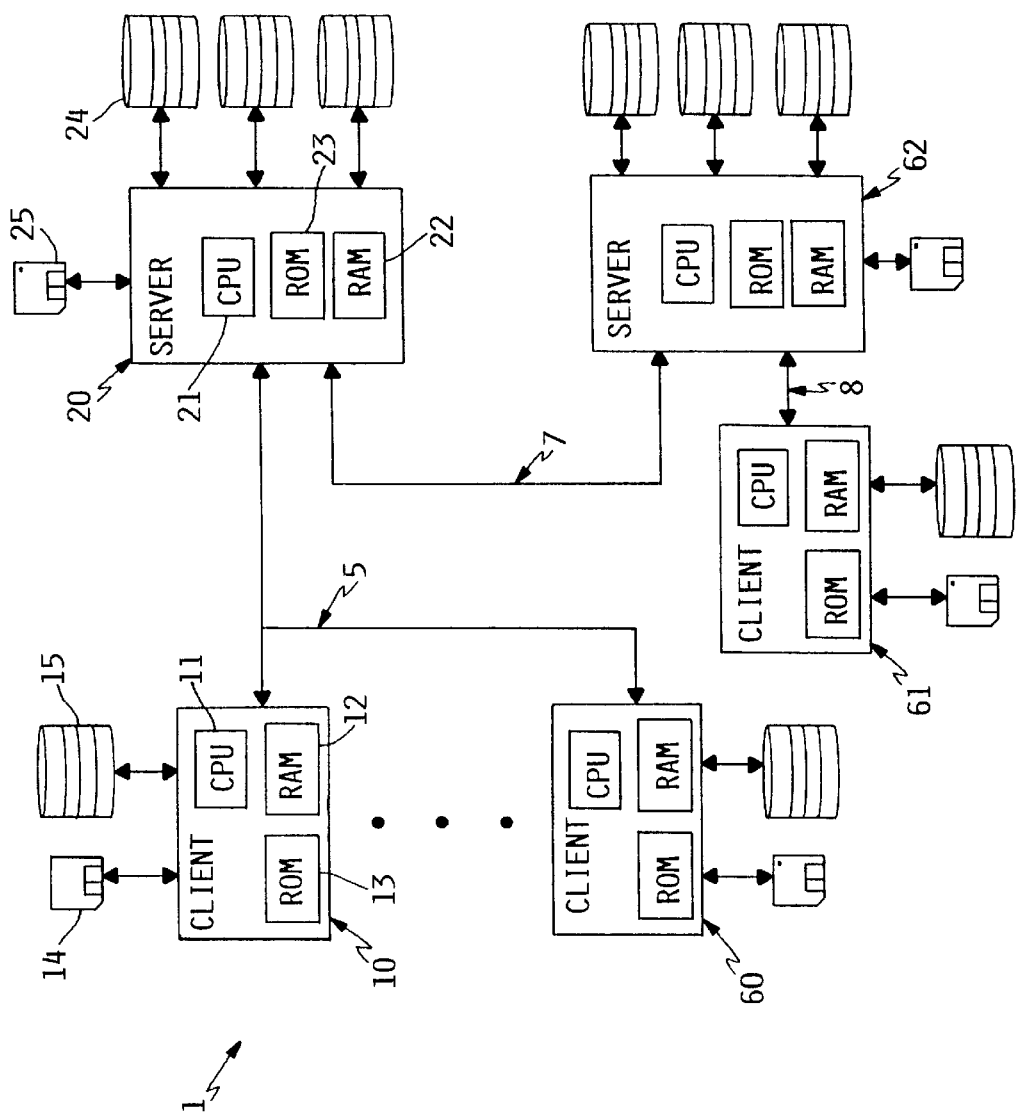
FIG. 1 is a functional block diagram illustrating the principle hardware components in a distributed computer system consistent with the principles of the invention.

Turning to the Drawing, wherein like numbers denote like parts throughout the several views, FIG. 1 shows an exemplary distributed computer system 1 consistent with the principles of the invention. System 1 includes a plurality of computer processes or systems (e.g., computer systems 10, 20 and 60) coupled through a local area network (LAN) 5. Any number of computer systems may be coupled through network 5; however, for the purposes of illustration, only systems 10 and 60, which function as client systems, and system 20, which functions as a server system, are shown in FIG. 1.

FIG. 1 also illustrates a wide area network (WAN) 7 between server system 20 and an additional server system 62 (which includes its own LAN 8 interconnecting the server to a client system 61). As is evident from this figure, enumerable network connections, including LAN, WAN, global, and combinations thereof, with any number of client and server computer systems, may be envisioned in a distributed computer system. Thus, the invention should not be limited to any particular arrangement of computer systems across any particular network configuration.

Client system 10 includes a central processing unit (CPU) 11, a non-volatile program storage space such as read only memory (ROM) 13, a workspace such as random access memory (RAM) 12, a mass storage device such as a hard disk 15, and a removable storage device such as a floppy drive 14, or alternatively a CD-ROM reader or tape drive. Similarly, server system 20 includes a CPU 21, a ROM 23, a RAM 22, a plurality of mass storage devices 24, and a removable storage device 25. Systems 60, 61 and 62 may also have a similar configurations.

The components shown for the above computer systems are generic to many types of computer systems. In some cases, server systems 20 and 62 may be implemented in larger or more powerful systems than client systems 10, 60 and 61. However, this is by no means indicative of all distributed computer systems, and therefore it should be appreciated that any of the above systems 10, 20, 60, 61 and 62 may be implemented in enumerable types of computer systems having various configurations of hardware, software, storage devices, and other peripheral components, including personal computers, workstations, network servers, minicomputers, mainframe computers, supercomputers, etc.

Figure 2A:
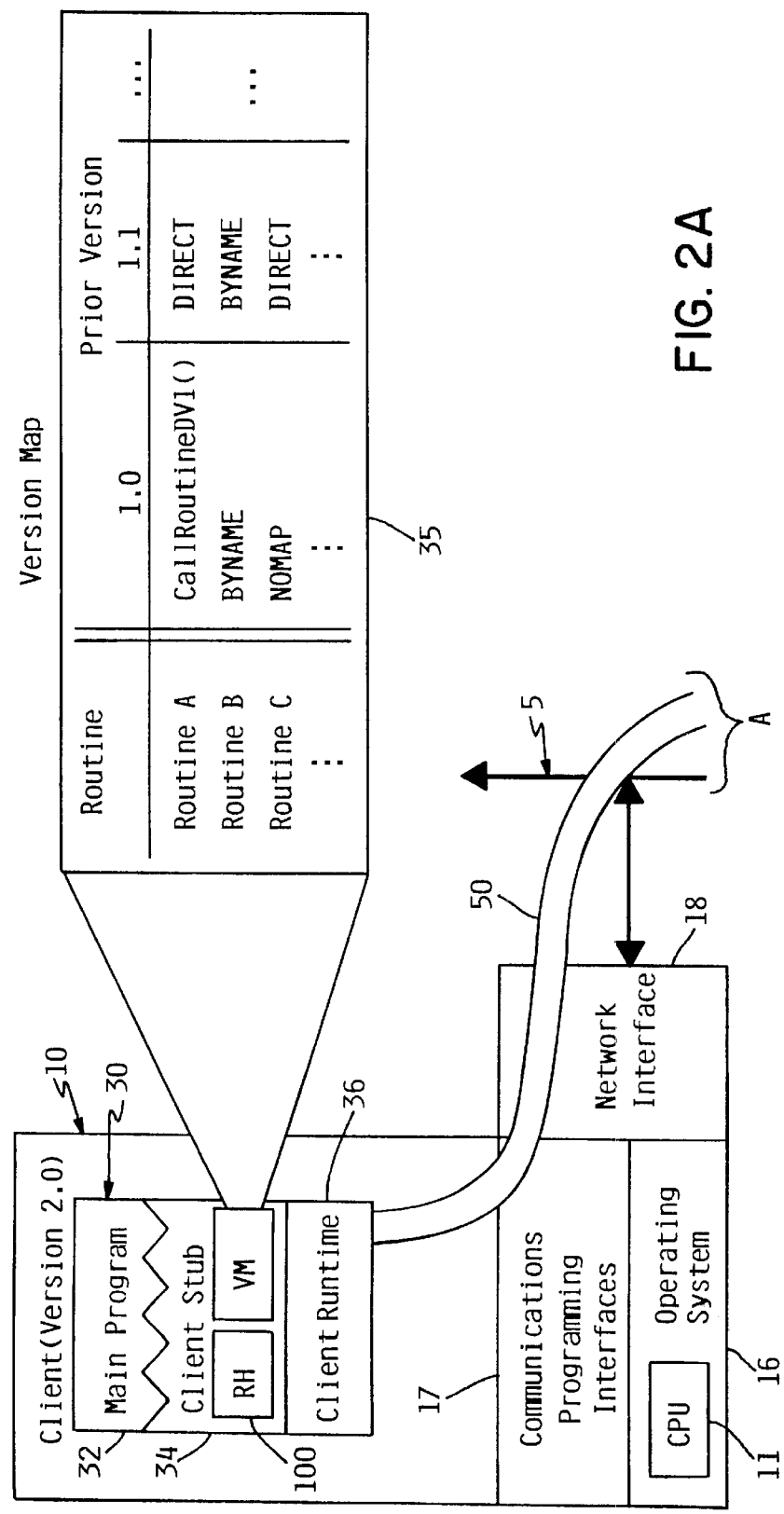
FIG. 2 is a functional block diagram illustrating the principle software components of a client computer system and a server computer system in the distributed computer system of FIG. 1.
Figure 2B:
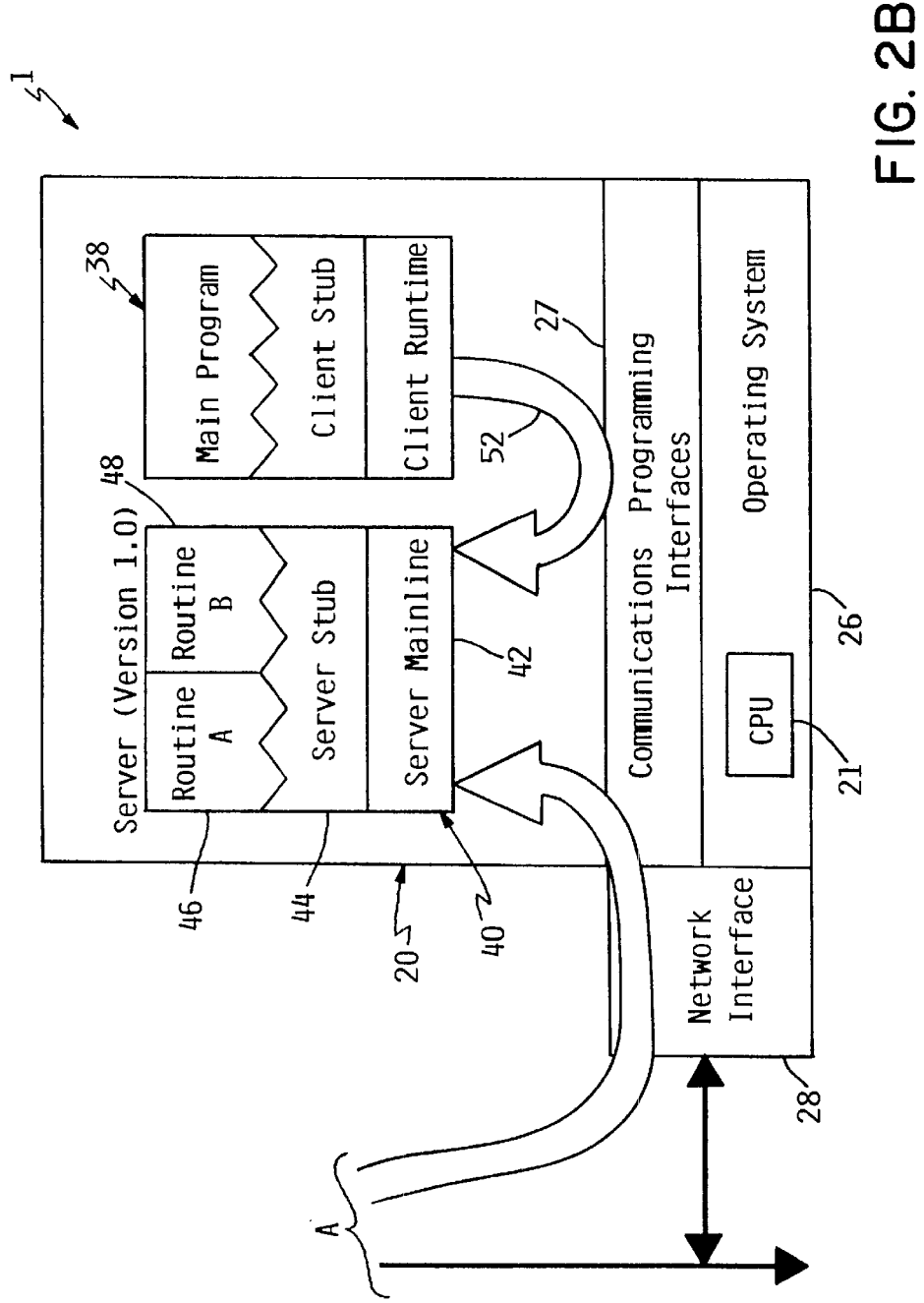

FIG. 2 illustrates the software components of systems 10 and 20 functionally connected across network 5. The functional hierarchy of system 10 includes an operating system 16 operating on CPU 11, with various communications programming interfaces (CPIs) being designated at 17. Applications or computer processes, e.g., process 30, execute on top of this platform, and communication through network 5 is handled by a network interface 18. Similar to system 10, the functional hierarchy of system 20 includes an operating system 26 operating on CPU 21, communications programming interfaces (CPIs) 27, network interface 28 and processes 38 and 40.

Elements 16, 17 and 18 of system 10, as well as elements 26, 27 and 28 of system 20, may be implemented under many different operating environments, including UNIX, OS/400, MVS, MS-DOS, OS/2, Windows, and the Macintosh operating system, among others, with network communication being handled in various network protocols such as IPX/SPX, TCP/IP, IBM Systems Network Architecture (SNA), among others. The organization of the software within client and server systems such as systems 10 and 20 is well understood in the art, and will vary for different applications.

It will be appreciated that the various applications, programs, computer processes and other supporting software (e.g., the operating systems and interfaces) are resident at different times on one or more "program storage devices." As used herein, the term "program storage device" may include any device or apparatus capable of storing information such as data or program code either in a volatile or non-volatile manner. Accordingly, a program storage device may comprise memory devices such as RAMs, ROMs, EPROMs, processor and cache memories, flash memories, customized integrated circuits, etc., as well as fixed or removable mass storage medias such as magnetic disks (fixed or removable), CD-ROMs, magnetic tape, etc. In addition, it will be appreciated that the various applications, programs, computer processes and other supporting software (generically "program products") may be transferred or downloaded to a computer system via network or modem in lieu of being provided on a storage media such as a floppy disk or CD-ROM, typically by first establishing a connection between the computer system and a server-type computer, and thereafter transmitting the program product to the computer system. Thus, it will be appreciated that a "program storage device" may also include any of the aforementioned memory and storage media of a server-type computer (e.g., a bulletin board or ftp site) which downloads or transfers a program product to other computer systems but does not actually execute the downloaded or transferred program product.

As discussed above, the preferred application of the invention is in the handling of remote procedure calls between client and server computer processes resident on separate computer systems coupled through a network in a distributed computer system. To illustrate this application, FIG. 2 shows a client process 30 executing on system 10 which issues a remote procedure call (designated by arrow 50 which passes through the different low level functional components which generally handle the call) across network 5 to a server process 40 executing on system 20.

Another preferred application of the invention is in handling external or remote procedure requests between multiple computer processes operating on the same computer or processing system, e.g., separate applications or programs running concurrently on a multi-tasking computer system. To illustrate this application, FIG. 2 shows another client process 38 executing on system 20 which is able to issue a remote procedure request (designated by arrow 52 and utilizing CPIs 27) internally within system 20 to server process 40 also resident on system 20. Accordingly, it will be appreciated that the terms "remote procedure" and "remote procedure request" when used herein may relate to client and server processes which either reside on the same or different computer systems. In addition, although the much of the remaining discussion herein will focus specifically on remote procedure calls (RPC's), one skilled in the art will appreciate that the discussion will also apply to remote procedure requests between processes running on a single computer system.

Moreover, it will also be appreciated that while individual computer processes will hereinafter be referred to as "clients" or "servers", such processes may function as both clients and servers in some applications.

Implementation of Remote Procedures in Distributed Computer Systems

As discussed above, remote procedure calls provide a mechanism for allowing a program or computer process running on one computer system to call a subroutine which is resident on a remote system. Thus, to illustrate the workings of the preferred embodiments of the invention, FIG. 2 shows one implementation of a distributed computer system wherein client system 10 issues a remote procedure call (designated as 50) to server system 20.

Consistent with the trend to implement modern computer programs using a structured, procedural approach, remote procedure calls are preferably implemented with only a minimum of additional design and implementation by an applications programmer. In many distributed computer systems, the primary implementation of remote procedure calls is provided through four components which are illustrated in FIG. 2. First, a pair of "stub" components, e.g., client stub 34 and server stub 44, implement the specific procedures which are to be sent across network 5. For example, the RPC stubs "marshall" and "unmarshall" the data comprising an RPC call and result to and from appropriate data packets or streams suitable for being sent across the network. The RPC stubs may also process transmitted and received data into compatible formats for their respective systems.

Another pair of procedures, e.g., client runtime 36 and server mainline 42, are generic routines which typically handle many of the low level functions that are independent of particular RPC's. These functions may include, for example, the actual transmission and receipt of data packets across the network, among others.

One purpose of the aforementioned configuration is to free an applications programmer from having to write much of the specific code necessary to implement RPC's. Another purpose of the configuration is to make RPC applications as platform independent as possible.

In general, to develop an RPC application, the desired interface between a client and a server is defined using an interface definition language (IDL) which specifies the desired remote procedures and the data structures, constants, and parameters required for implementation of the procedures. For example, FIG. 3 illustrates a typical RPC interface, which generally has the form:

interface<interface name>version (<major>[:<minor>]) {declarations}

Next, the interface file is compiled using an IDL compiler. Typically, compilation of the interface file results in four files. On the client system, client stub and client header files are generated. The client stub file is a compiled source file which is linked with the client runtime code to provide access to the remote procedures. The client header is a header file containing prototypes, data structures and constants generated from the IDL file, and defining the format for calling the remote procedures in the client system.

Similarly, two files are generated on the server system, including a server stub file and a server header file. The server stub file is a compiled source file, linked with the server, that formats parameters prior to calling the actual routines. The server header file is a header file containing the prototypes, data structures and constants generated from the IDL file, and defining the calling format of the routines of the server.

The resulting client and server stub files therefore generally contain all the code necessary to collect all the client parameters and package them into a buffer, transmit the buffer across the network, unpack the buffer into a format the server understands, call the routines on the server, and return any results to the client. The header files are for use by the application programmer when coding the application, but they do not form components of the final executable application code.

Once the aforementioned files have been compiled, the client and server portions of the code are generated for the RPC application. The client portion of code (e.g., main program 32 of system 10) should be written to call the desired remote procedures using the prototypes defined in the client header file. Similarly, the server portion of code should provide the actual remote procedure routines (e.g., routines 46, 48 on system 20) that match the prototype in the server header file. The client and server header files need not be exactly the same due to type conversions, but they will typically be very close.

To complete an RPC application, the application code is compiled and linked to the respective compiled stub files. The respective client and server object code are then ready to be installed on suitable client and server computer systems.

A number of interface definition languages exist, e.g., for the Open Systems Foundation Distributed Computing Environment (OSF DCE), the Windows 95 and Windows NT operating systems, the UNIX operating system, and the Sun Network File System (NFS), among others. Any interface definition language may be modified to implement the invention as will be described below. One UNIX RPC interface is described, for example, in "UNIX System V Release 4 Programmer's Guide: Networking Interfaces" available from UNIX Systems Laboratories. The OSF DCE RPC interface is described, for example, in "OSF DCE Application Development Guide" available from the Open Software Foundation. Other known systems and interfaces may also be used. Interfaces may be implemented in the C programming language or one of its derivatives such as C++, although other programming languages, including FORTRAN, may also be used.

The above discussion pertaining to programming and implementing distributed computer systems using remote procedure calls is generally understood in the art. It will be appreciated that the particular implementations may vary for different systems. Furthermore, as the general operation of distributed computer systems and the like is generally known, the particular implementation of the RPC client and server code need not be discussed in greater detail for a complete understanding of the invention.

Moreover, it will be appreciated that, in preferred embodiments of the invention, a remote procedure interface is utilized to "define" the remote procedures. By "define", what is meant is the interface provides a "prototypes" or other suitable templates which sets forth details such as procedure name, expected sent and returned parameters, constants and data structures, etc. which permit a program or routine running on the calling process to send an appropriate remote procedure request that will be recognized and understood by the remote computer process that actually executes the requested remote procedure. As such, it will also be appreciated that a remote procedure interface does not "exist" in a computer process in the format shown in FIGS. 3 or 4, for example. Instead, the remote procedure interface is primarily a tool or language which defines the protocol for a programmer to use when writing the code which calls remote procedures from a calling computer process. The remote procedure interface, however, may be considered to "exist" in an executing computer process during runtime, since the stub file in the computer process of the preferred embodiments contains the executable code that expects and implements a given remote procedure interface when receiving and formatting remote procedure requests from a calling process.

Implementation of Version Mapping into RPC Framework

As discussed above, upgrading an RPC application executing on multiple computers in a distributed computer system is often problematic due to a difficulty in upgrading all client and server processes or components of the application. While conventional RPC implementations will allow a server to support multiple versions, these implementations do not support the case where an RPC client is upgraded to a newer version of an interface before the server is upgraded.

This problem associated with conventional implementations is addressed herein by extending the interface definition language to include the concept of a "version map" such as version map 35 illustrated functionally in FIG. 2. A version map, which is preferably resident in the client stub (e.g., client stub 34 in system. 10) provides a formal statement of how older versions of a procedure should be handled, thereby freeing the caller of an RPC routine from specifically addressing which version of the routine has to be called based upon the versions of the interface resident on the client and server computer systems.

Generally, the kinds of mapping that may be required between versions may include transforming parameters prior to their being sent to a remote procedure, transforming parameters that are returned from a remote procedure, providing default values for parameters that do not exist in one version or the other, calling a substitute version of a procedure, and rejecting the call if certain conditions exist, among others. In general, the version map may be considered as a table that is generated as part of the client stub that states, for each procedure, how to map that procedure to other versions of the interface. It will be appreciated that the concept of the version map can also be extended to other constructs in an IDL definition, including objects and data structures, for example.

Many different version mappings may be supported in an interface consistent with the invention. As one example, in system 1 of FIG. 2, version map 35 supports at least three different "mappings" for a version of a remote procedure in the interface definition. The mappings are defined in an extended version of a remote procedure interface, e.g., using the statement:

versionmap (<version><mapping>);

A first mapping is a direct mapping, e.g., using the keyword "DIRECT" (such as for the version 1.1 mapping of Routine C in version map 35). The use of this keyword indicates that the procedure can be mapped directly between the two versions with no conversion. The runtime simply calls the routine in the mapped version without modification.

A second mapping is useful when two versions of a procedure differ only in the numbers and/or names of parameters. This mapping may be implemented, for example, using the keyword "BYNAME" (such as for the version 1.0 mapping of Routine B in version map 35). Under this mapping, a procedure can be mapped simply by matching parameters by name. Unmatched parameters may default to a default value such as zero.

A third mapping may be useful when greater modifications are required to execute a procedure in an earlier version. In this case, the keyword may be the name of a mapping procedure (such as the CallRoutineDV1( ) routine for the version 1.0 mapping for Routine A in version map 35). Under this mapping, the mapping procedure must be separately coded to perform any of the necessary functions required to call the earlier version procedure. This may include, for example, calling a substitute remote procedure, adding or removing parameters, setting specific defaults for parameters, or handling any other situation which requires more modification than simply matching parameters by name.

In addition to the above mappings, an additional keyword, such as "NOMAP", may be used to indicate when no mapping exists for a particular version (such as the version 1.0 map for Routine C in version map 35). In this case, the RPC runtime may indicate a failed call due to the inability to map a call to the earlier routine.

A failed call may also be indicated by the RPC runtime if a particular version is not supported by the interface (i.e., when no keywords are found in the version map for a particular version). Alternatively, the RPC runtime may attempt to handle earlier versions in different manners, e.g., by using the mapping from the earliest supported version for the interface.

As another example, FIG. 4 shows an extended RPC interface, which has been upgraded from the interface shown in FIG. 3 to include a version 2.0 interface. Each remote procedure listed in the version 2.0 interface includes a "versionmap( )" parameter to map each routine to prior versions.

In this example, longer user names (previously 20, now 30) are supported in version 2.0, and a new function testUID( ) is defined. Each defined procedure in the new version of the interface states how to map back to the previous version. Given the longer user names, the getUser( ) and setUser( ) functions are mapped by name using the keyword "BYNAME". The getUIDfromName( ) and getNamefromUID( ) functions can be called without any parameter mapping, as denoted by the keyword "DIRECT". The testUID( ) function cannot be mapped directly; however, a short procedure may be written to map this to some other call. This short procedure is identified by the procedure name mapTestUIDProc. This procedure may perform any tasks necessary to reformat the call to support a prior version, such as calling a substitute procedure, setting defaults, adding or removing parameters, etc. For example, the getNamefromUID( ) routine could instead be called to test if a UID exists. However, since such a procedure would be specific to the particular remote procedure involved, it is not discussed separately herein.

It will be appreciated that various alternative mappings, which perform additional or different mapping functions, may be incorporated into the extended interface within the scope of the present invention. Therefore, the invention should not be limited to the particular mappings and keywords utilized in the preferred embodiments disclosed herein.

To implement version mapping in an RPC application, the client-side request handling, performed in the client stub, must be modified from conventional runtime routines. In particular, request handling requires that (1) the version of the server be determined, and (2) any mapping to earlier versions be performed, prior to issuing the remote procedure call over the network.

In general there are three primary ways that a client can locate a server on a network. First, the client can explicitly be told the name and/or address of the server (e.g., via a parameter to the procedure, an environment variable, or an external configuration file). Second, the client and server can locate each other via some broadcast mechanism (e.g., the IPX SAP broadcasts). This can happen in either direction, with the client or server broadcasting its existence, and the other responding. Third, the client can look up the server in some form of network directory (e.g., the DCE cell directory service). Typically, with the first two ways, the client has very little knowledge about the server, other than its name and address. With the third way, however, the client can generally obtain additional information from the server, such as exactly what interfaces and protocols it supports.

The manner in which requests are handled during RPC runtime may be different for systems that support a network directory as opposed to those that do not. This is because version mapping needs to be determined prior to conversion of the parameters and marshalling of data in preparation for sending an RPC request over a network. If a directory exists, the client can typically determine the version of the server rather easily. However, if no directory exists, the data may be marshalled and the call made before determining that the wrong version of the server was found. This typically requires the data to be remarshalled and the call reissued.

Figure 5:
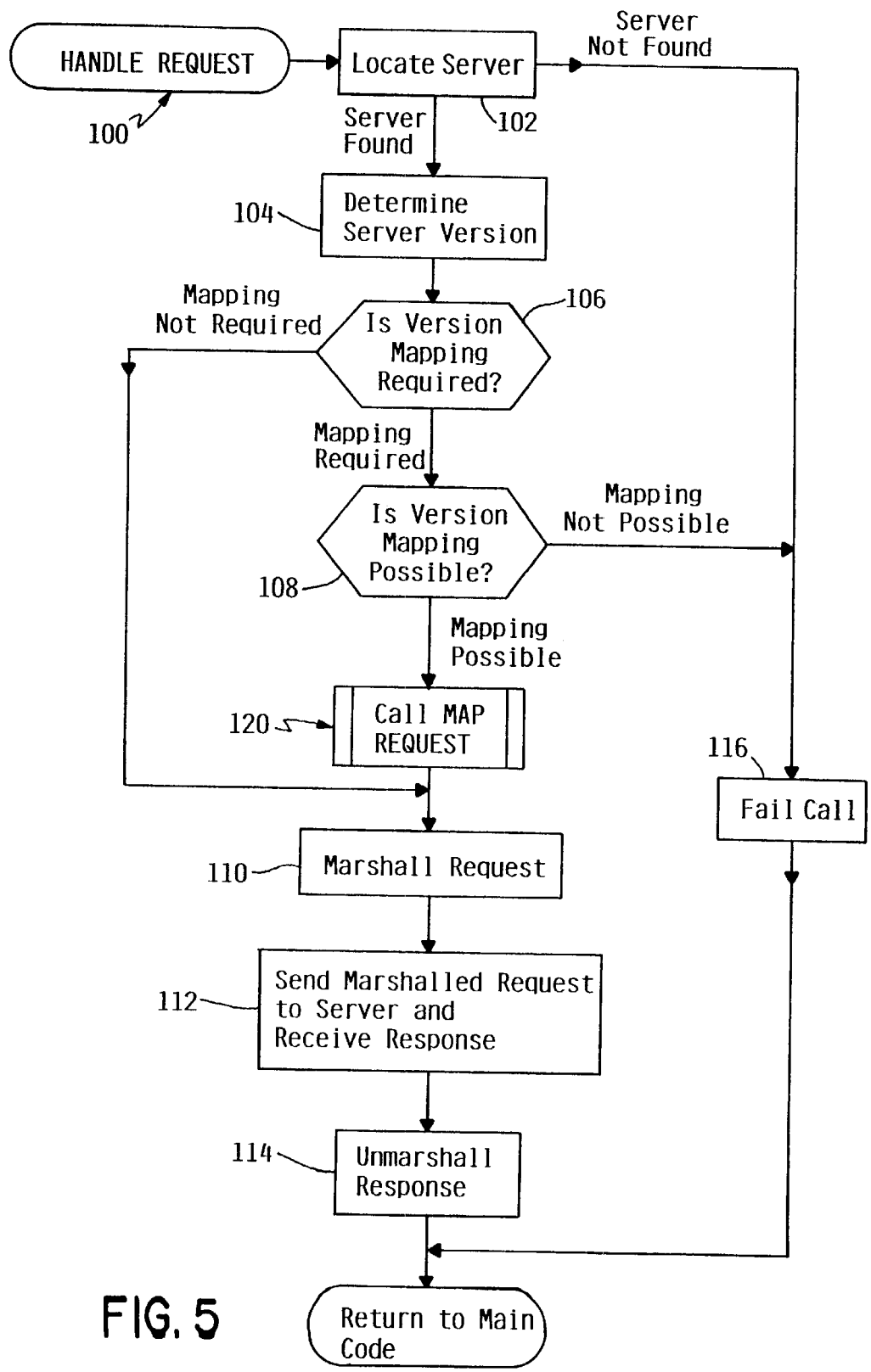
FIG. 5 is a flowchart illustrating the program. flow for a preferred HANDLE REQUEST routine executing on the client computer system of FIG. 2.

FIG. 5 shows a flow chart of a preferred request handler, routine HANDLE REQUEST 100, for use on distributed computer systems which utilize network directories. This routine represents typical runtime processing of a remote procedure request in client stub file 34 of process 30. Routine 100 can generally be segregated into a mapper with a mapping function (blocks 102–108 and 120) and a requester with a requesting function (blocks 110–114).

As for the mapping function, routine 100 begins in block 102 by attempting to locate the destination server, typically by accessing a network directory in a manner known in the art. If the destination server is not found, the remote procedure call fails, and control passes to block 116 to indicate the failure prior to returning to the main code, or calling routine. If, however, the server is found, the version of the server is determined in block 104, again by accessing the network directory. Next, in block 106, routine 100 determines whether version mapping is required, generally by comparing the version of the server with the version of the client upon which the routine is running.

If no mapping is required, which typically occurs when the server supports the version of the client, control passes to the requesting function of routine 100, specifically to block 110 to "marshall" the request. In marshalling the request, the pertinent information required to issue the remote procedure request is gathered and formatted into a stream of bytes that can be transmitted across the network. Then, in block 112, the marshalled request data is sent to the server across the network, and the routine waits until a response is received. Next, in block 114, the response is "unmarshalled", which is essentially the reverse of marshalling, to obtain the resulting information forwarded from the server in response to the remote producer request. Once the response has been unmarshalled, the routine terminates to allow the main code to process the response.

The response from a remote procedure may consist only of an acknowledgment of the request, or may include data which was requested during the remote procedure. The operations of marshalling, unmarshalling, sending and receiving data across a network in a distributed computer system are generally understood in the art. Moreover, it will be appreciated that additional formatting or other transformation of data either in the request or in the response may be required such that both client and server obtain data from the other in a compatible format.

Returning to block 106, if it is determined that version mapping is required, e.g., because the, server does not support the version of the client issuing the remote procedure request, control passes to block 108 to determine if version mapping is possible. In this block, the version of the server is compared against the different versions to which version mapping is defined in the remote procedure interface for the client. For example, some interfaces may be made backward-compatible only for a few prior versions, e.g., if the changes between the current version and a much earlier version have become so significant that the functionality of the much earlier version is insufficient for clients running the current version. In such a case, mapping an interface to the much earlier version is unnecessary. Therefore, control is diverted in this situation to block 116 to indicate a failed call prior to returning to the main code.

If, on the other hand, the version of the server is supported by the client, control passes to block 120 to call a separate MAP REQUEST routine 120 which handles the mapping prior to the executing the requesting function of blocks 110, 112 and 114.

Figure 6:
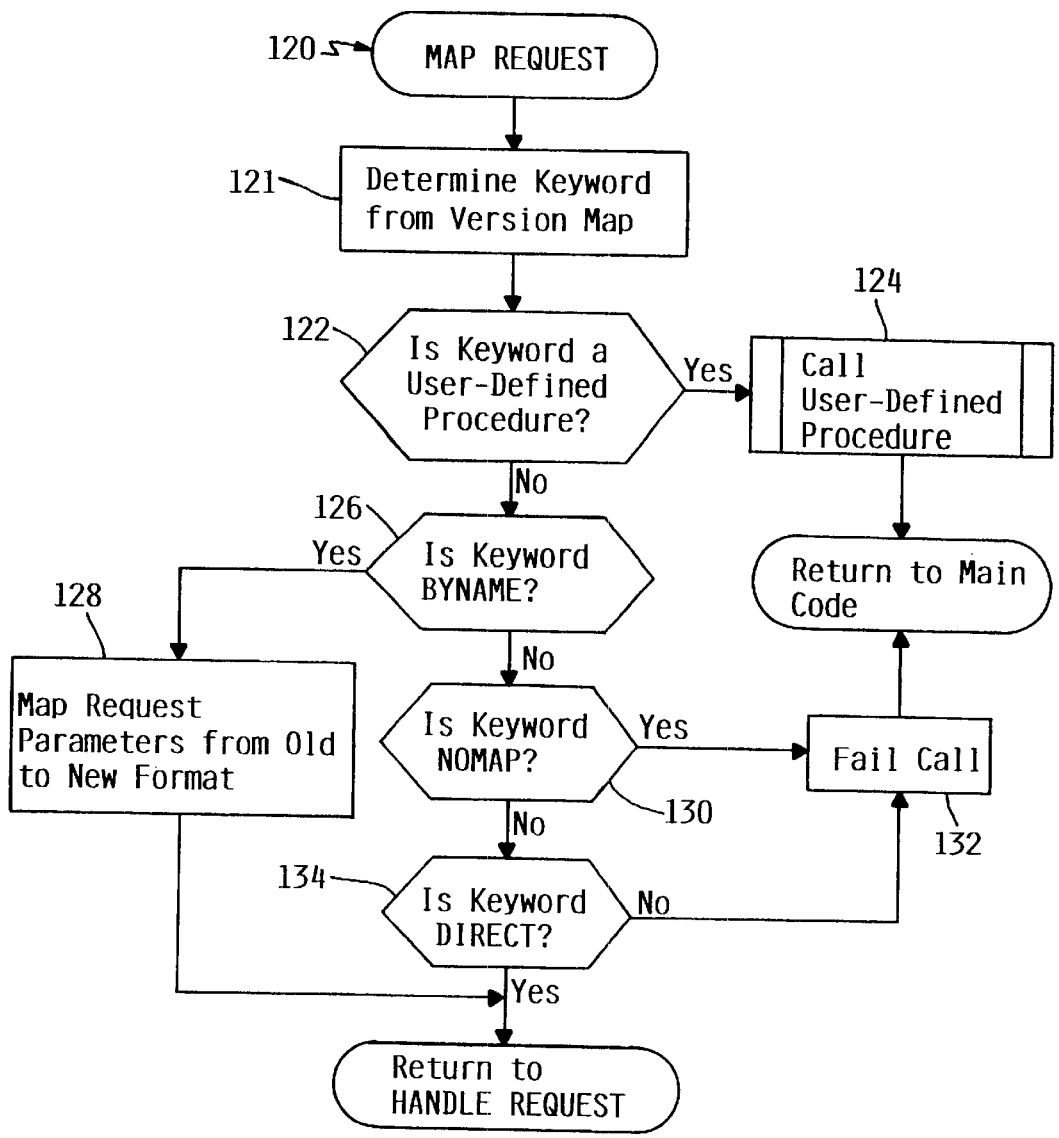
FIG. 6 is a flowchart illustrating the program flow for the MAP REQUEST routine of FIG. 5.

FIG. 6 illustrates MAP REQUEST routine 120 in greater detail. Essentially, this routine first performs a keyword determining function in block 121 by accessing the versionmap( ) parameter in the client interface (specifically in the version map or table in the client stub file) for the particular procedure defined in the remote procedure interface.

Based upon the keyword returned from the version map for the particular version of the server, blocks 122, 126, 130 and 134 divert control to separately handle the different mappings. Alternatively, blocks 122, 126, 130 and 134 may be replaced with a single "case" function as is generally known in the art.

If the version map for the particular routine and version of the server points to a user-defined procedure (e.g., the version 1.0 mapping for Routine A in FIG. 2, or the mapping for the testUID( ) routine of FIG. 4), control is passed to block 124 to call the specific procedure referred to in the version map, prior to terminating the HANDLE REQUEST routine 100. It will be appreciated that in many instances an alternative remote procedure may be called, in which case the HANDLE REQUEST routine 100 may be called recursively by this user-defined procedure.

If, on the other hand, the version map returns a "BYNAME" keyword, control is passed to block 128 by block 126 to map the various parameters to the format expected by the server. This essentially results in the original parameters for the remote procedure request being replaced with the new parameters that are specific to the server version. In addition, if a field in the new format (corresponding to the server version) does not have a counterpart in the client version of the interface, this field or parameter will default to zero. After completion of the field mapping, control then returns to the HANDLE REQUEST routine to continue processing of the request in block 110 of FIG. 5.

If the version map returns a keyword of "NOMAP", block 130 passes control to block 132 to indicate a failed call, prior to terminating the HANDLE REQUEST routine and returning to the main code. This is indicative of a procedure which does not have a counterpart on the server version, and which therefore may not be called by the client.

Finally, if the keyword return from the version map is "DIRECT", block 134 merely returns control to the HANDLE REQUEST routine (specifically block 110 of FIG. 5) to continue processing of the request. When such a keyword is encountered, no mapping is required, and the request may be made with no modification to accommodate the earlier server version.

If block 134 does not receive a "DIRECT" keyword, the system has received a keyword which is not recognized. Accordingly, control passes to block 132 to indicate a failed call prior to returning control to the main code.

Figure 7:
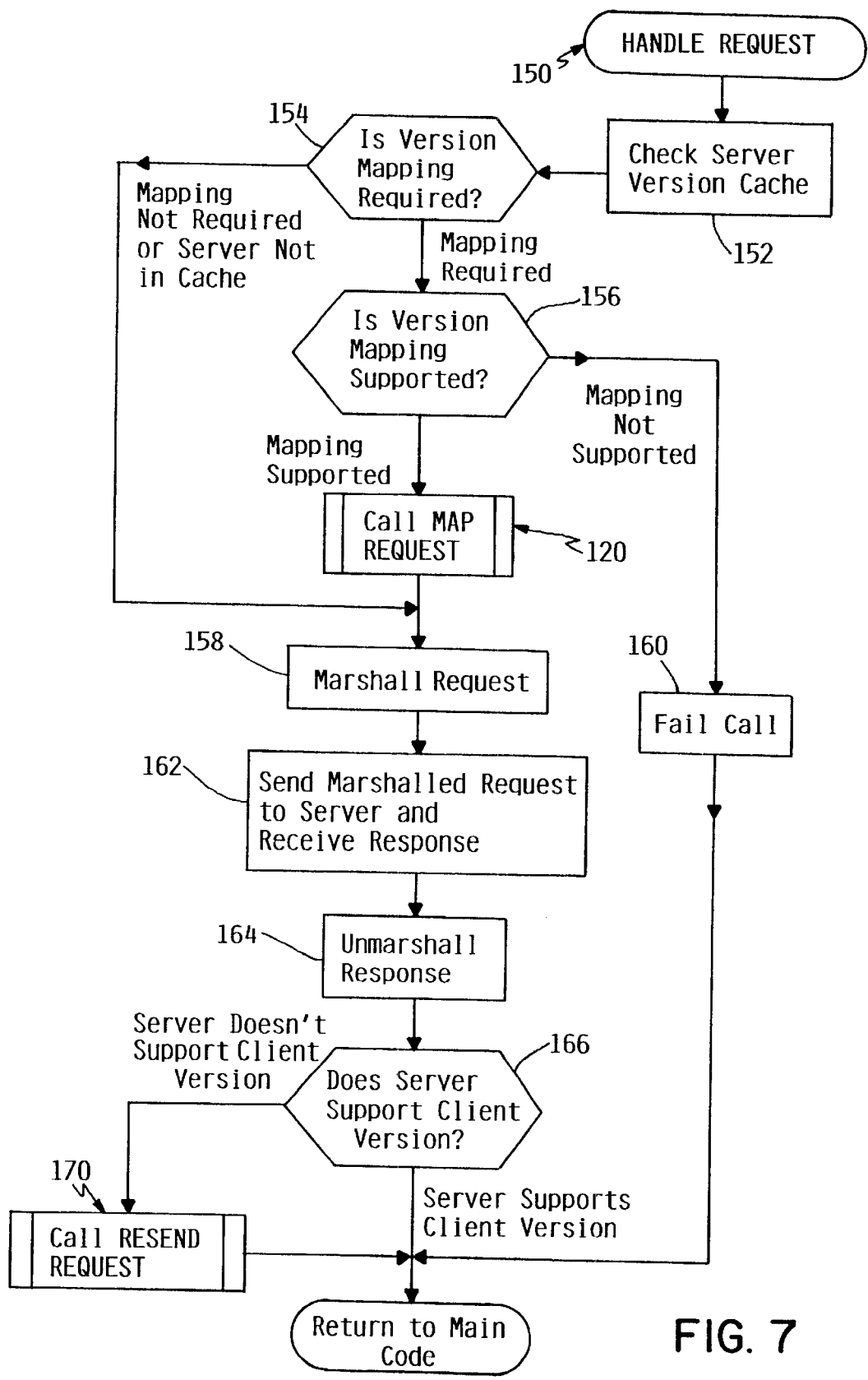
FIG. 7 is a flowchart illustrating the program flow of an alternate HANDLE REQUEST routine to that of FIG. 5, primarily for use in distributed computer systems not having network directories.

In the situation where a network directory is not available in the distributed computer system, an alternative HANDLE REQUEST routine 150, also including a mapper with a mapping function (blocks 120 and 152–156) and a requester with a first requesting function (blocks 158–164), is executed as shown in FIG. 7. In this routine, the client computer process preferably supports a "cache" or table of servers and their versions so that at most one incorrect version call is made to a given server before the correct server version is found. In essence, the client computer process builds a local directory of servers and their supported versions, rather than relying on a separate network directory to provide this information.

As shown in FIG. 7, routine 150 begins with a mapping function at block 152 by checking the server version cache internal to the client. Block 154 then determines if version mapping is required. If the server is found in the cache and it is determined that the version supported by the server requires mapping from the client version, control passes to block 156 to determine if the server version is supported by the client. If the mapping is not supported, control passes to block 160 to indicate a failed call prior to returning control to the main code.

On the other hand, if the server version is supported by the client, control passes to block 120 to call the MAP REQUEST routine illustrated in FIG. 6. Then, after the request has been mapped in block 120, control passes to the first requesting function of routine 150, where block 158 marshalls the request. Block 162 then sends the marshalled request to the server and waits to receive a response thereto. The response is then unmarshalled in block 164.

Next, block 166 determines whether the server supports the client version of the RPC interface. Generally, block 166 will indicate that the server supports the client version if a suitable or expected response is returned from the server in reply to the remote procedure request.

On the other hand, if the server does not support the client version, the response to the request which is returned by the server will generally indicate a failed request, and preferably include an indication of the current version of the server (e.g., through returning a list of supported versions for the server). On the other hand, if no indication of the versions supported by the server is provided, the client may try all of its supported versions until a suitable response is received from the server, although such an implementation would not be as efficient as others.

In the case that the server doesn't support the client version, a separate routine, RESEND REQUEST routine 170, is called by block 166 prior to returning control to the main code and terminating the HANDLE REQUEST routine. Routine 170 forms a second request function for the requester of routine 150.

Figure 8:
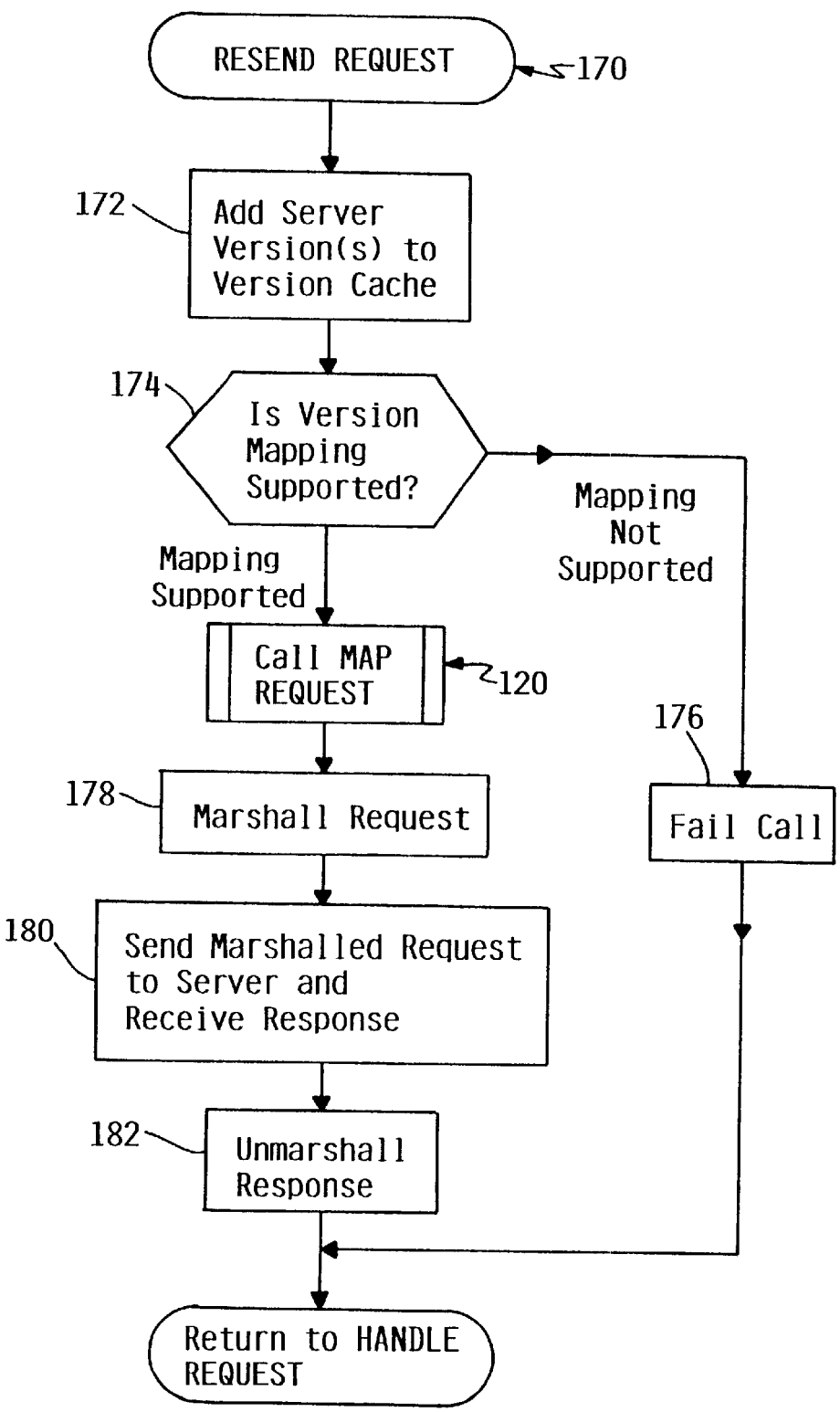
FIG. 8 is a flowchart illustrating the program flow of the RESEND REQUEST routine of FIG. 7.

The RESEND REQUEST routine 170 is illustrated in greater detail in FIG. 8. First in this routine, block 172 adds the server to the version cache, as well as the supported version or versions supported by the server. In some instances, e.g., if the server has been upgraded since the last access by this client, the server may already be present in the cache, whereby only an update of the supported versions for the server is required.

Next, in block 174, the supported versions of the server are compared with the version of the client to determine whether it is possible to map the request to a version supported by the server. If this is not possible, control is diverted to block 176 to indicate a failed call and to return control to the HANDLE REQUEST routine. If, however, a version of the server is supported by the client, control passes to block 120 to map the request consistent with the version map of the client. Next, in blocks 178, 180 and 182, the request is marshalled and sent to the server, and a response is received and unmarshalled, in the manner described above. Upon completion of block 182, the routine terminates and returns to HANDLE REQUEST routine 150.

Returning to block 154 of FIG. 7, in the event that a server is not recognized in the server cache for the client, block 154 diverts control to block 158 without attempting to map the request to a prior version. Then, blocks 158, 162 and 164 are executed as described above to attempt to issue the request. In this case, the routine does not know which versions are supported by the server. Thus, this initial request serves merely the function of obtaining the supported versions of the server so that the request may be resent in a proper manner (and so that the server version cache can be updated) in RESEND REQUEST routine 170.

Various changes and modifications may be made to the preferred embodiments without departing from the spirit and scope of the invention. For example, as discussed above, different manners of detecting and maintaining a register of servers and supported versions may be used. Moreover, various degrees of mapping between versions may be supported above and beyond the keywords supported by the preferred embodiment. Other modifications will be apparent to one skilled in the art.

Therefore, the invention provides substantial benefits by virtue of the flexible and reliable manner in which multiple versions of remote procedure interfaces are permitted to coexist in a distributed computer system. As one skilled in the art will appreciate that other modifications may be made to the preferred embodiments consistent with the invention, the invention therefore lies in the claims hereinafter appended.

What is claimed is:

1. In an environment having a first computer process supporting an upgraded version of a remote procedure interface and a second computer process supporting a prior version of the remote procedure interface, a method for requesting in the first computer process a remote procedure to be executed on the second computer process, comprising:

determining whether the second computer process supports the upgraded version of the remote procedure interface supported by the first computer process;

determining a mapping indication associated with the remote procedure if the second computer process does not support the upgraded version of the remote procedure interface; and responding according to the mapping indication.

2. The method of claim 1, wherein responding according to the mapping indication includes directly mapping a first version of the remote procedure defined by the upgraded remote procedure interface to a second version of the remote procedure defined by the prior remote procedure interface.

3. The method of claim 2, wherein responding according to the mapping indication further includes, after directly mapping, requesting the second version of remote procedure to be executed on the second computer process.

4. The method of claim 1, wherein responding according to the mapping indication includes transforming parameters associated with the one remote procedure before or after execution of the one remote procedure on the second computer process.

5. The method of claim 4, wherein responding according to the mapping indication further includes, after transforming, requesting a second version of the remote procedure to be executed on the second computer process, wherein the second version of the remote procedure is defined by the prior version of the remote procedure interface and differs from a first version of the remote procedure defined by the upgraded remote procedure interface.

6. The method of claim 1, wherein responding according to the mapping indication includes requesting a different remote procedure.

7. The method of claim 1, wherein responding according to the mapping indication includes returning a failed request indication.

8. The method of claim 1, wherein:

determining whether the second computer process supports the upgraded version of the remote procedure interface includes accessing a cache to determine supported versions of the remote procedure interface for the second computer process; and the method further includes requesting execution of a first version of the remote procedure defined by the upgraded version of the remote procedure interface if the second computer process is not in the cache and if, in the response to the request, the second computer process indicates that the first version is not supported, adding the second computer process to the cache.

9. A computer system, comprising:

an upgraded version of a remote procedure interface defining one or more remote procedures and at least one mapping indication associated with each of the remote procedures;

a first computer process, having access to the upgraded version of the remote procedure interface, for requesting one or the one or more remote procedures to be executed on a second computer process supporting a prior version of the remote procedure interface; and a request handler residing in the first computer process that identifies a mapping indication associated with the one remote procedure if the second computer process does not support the upgraded version of the remote procedure interface and responds according to the mapping indication.

10. The computer system of claim 9, wherein the request handler responds according to the mapping indication by directly mapping a first version of the one remote procedure defined by the upgraded remote procedure interface to a second version of the one remote procedure defined by the prior remote procedure interface.

11. The computer system of claim 10, wherein the request handler responds to the mapping by requesting, after directly mapping, the second computer process to execute the second version of the one remote procedure.

12. The computer system of claim 9, wherein the request handler responds according to the mapping indication by transforming parameters associated with the one remote procedure before or after execution of the one remote procedure on the second computer process.

13. The computer system of claim 12, wherein the request handler responds to the mapping by requesting, after transforming, the second computer process to execute a second version of the one remote procedure wherein the second version of the one remote procedure is defined by the prior version of the remote procedure interface and differs from a first version of the one remote procedure defined by the upgraded remote procedure interface.

14. The computer system of claim 9, wherein the request handler responds according to the mapping indication by requesting a substitute remote procedure.

15. The computer system of claim 9, wherein the request handler responds according to the mapping indication by returning a failed request indication.

16. The computer system of claim 9, wherein the request handler determines whether the second computer process supports the upgraded version of the remote procedure interface by accessing a cache to determine supported versions of the remote procedure interface for the second computer process and the request handler request execution of a first version of the remote procedure defined by the upgraded version of the remote procedure interface if the second computer process is not in the cache and if, in response to the request, the second computer process indicates that the first version is not supported, adding the second computer process to the cache.

17. The computer system of claim 9, wherein the upgraded version of the remote procedure interface includes a plurality of mapping indicators associated with the one remote procedure, each of the plurality of mapping indicators corresponding to a different prior version of the remote procedure interface.

18. An article of manufacture for use in requesting a remote procedure to be executed on a second computer process, the article of manufacture comprising computer-readable storage medium having code embodied therein that causes a first computer process to perform the steps of:
   determining whether the second computer process supports an upgraded version of a remote procedure interface supported by the first computer process;
   determining a mapping indication associated with the remote procedure if the second computer process does not support the upgraded version of the remote procedure interface; and
   responding according to the mapping indication.

19. The article of manufacture of claim 18, wherein responding according to the mapping indication includes directly mapping a first version of the remote procedure defined by the upgraded remote procedure interface to a second version of the remote procedure defined by the prior remote procedure interface.

20. The article of manufacture of claim 19, wherein responding according to the mapping indication further includes, after directly mapping, requesting the second version of remote procedure to be executed on the second computer process.

21. The article of manufacture of claim 18, wherein responding according to the mapping indication includes transforming parameters associated with the one remote procedure before or after execution of the one remote procedure on the second computer process.

22. The article of manufacture of claim 21, wherein responding according to the mapping indication further includes, after transforming, requesting a second version of remote procedure to be executed on the second computer process wherein the second version of the remote procedure is defined by the prior version of the remote procedure interface and differs from a first version of the remote procedure defined by the upgraded remote procedure interface.

23. The article of manufacture of claim 18, wherein responding according to the mapping indication includes requesting a user-defined remote procedure.

24. The article of manufacture of claim 18, wherein responding according to the mapping indication includes returning a failed request indication.

25. The article of manufacture of claim 18, wherein:
   determining whether the second computer process supports the upgraded version of the remote procedure interface includes accessing a cache to determine supported versions of the remote procedure for the second computer process; and
   the code further causes the first computer process to perform the steps of requesting execution of a first version of the remote procedure defined by the upgraded version of the remote procedure interface if the second computer process is not in the cache and if, in response to the request, the second computer process indicates that the first version is not supported, adding the second computer process to the cache.

26. A method of transmitting a program product to a computer system, the method comprising the steps of:
   (a) establishing a connection with the computer system; and
   (b) transmitting the program product to the computer system, the program product being executable by a first computer process on the computer system to request execution of a remote procedure by a second computer process, the; program product having code embodied therein that causes the first computer process to perform the steps of:
      determining whether the second computer process supports an upgraded version of a remote procedure interface supported by the first computer process;
      determining a mapping indication associated with the remote procedure if the second computer process does not support the upgraded version of the remote procedure interface; and
      responding according to the mapping indication.

27. A method for requesting in a client computer process a particular remote procedure to be executed on a server computer process, wherein the client computer process supports a newer version of a remote procedure interface and the server computer process supports an older version of the remote procedure interface, the newer version and older version of the remote procedure interface each including one or more remote procedures and at least one remote procedure o the newer version having the same name as and at least one different construct than a corresponding remote procedure of the older version, the method comprising:
   determining whether the server computer process supports the newer version of the remote procedure interface supported by the client computer process;
   determining a mapping indication, between the newer and older versions of the remote procedure interface, associated with the particular remote procedure if the server computer process does not support the newer version of the remote procedure interface; and
   responding according to the mapping indication.

* * * * *